United States Patent [19]
Heien

[11] Patent Number: 6,021,906
[45] Date of Patent: Feb. 8, 2000

[54] DISH DRAINING DEVICE

[76] Inventor: Troy A. Heien, 5704 Southview Rd, Laramie, Wyo. 82070

[21] Appl. No.: 09/282,220

[22] Filed: Mar. 31, 1999

[51] Int. Cl.⁷ .............................. A47F 5/00; A47B 77/06
[52] U.S. Cl. ...................... 211/41.3; 211/41.4; 312/229
[58] Field of Search ................................ 211/41.3, 41.4, 211/106, 87.01, 41.8; 312/229

[56] References Cited

U.S. PATENT DOCUMENTS

| | | | |
|---|---|---|---|
| 4,756,582 | 7/1988 | Heien | 211/41.4 X |
| 5,109,990 | 5/1992 | Murphy et al. | 211/41.3 |
| 5,485,927 | 1/1996 | Hubbard | 211/41.3 |
| 5,794,797 | 8/1998 | Kuntz | 211/41.3 |

*Primary Examiner*—Robert W. Gibson, Jr.
*Attorney, Agent, or Firm*—Roland H. Shubert

[57] ABSTRACT

A device including racks for supporting dishes and utensils for gravity draining and air drying is provided. The device includes a back panel having a water catchment basin at the bottom thereof which is attached to a wall or other vertical support surface by way of grooved pins that pass through openings provided in the panel. A wire frame includes arcuate brackets which fit within the pin grooves to support the frame and to lock the frame and panel onto the pins. Racks to hold glassware, plates and other utensils are attached to the frame.

16 Claims, 10 Drawing Sheets

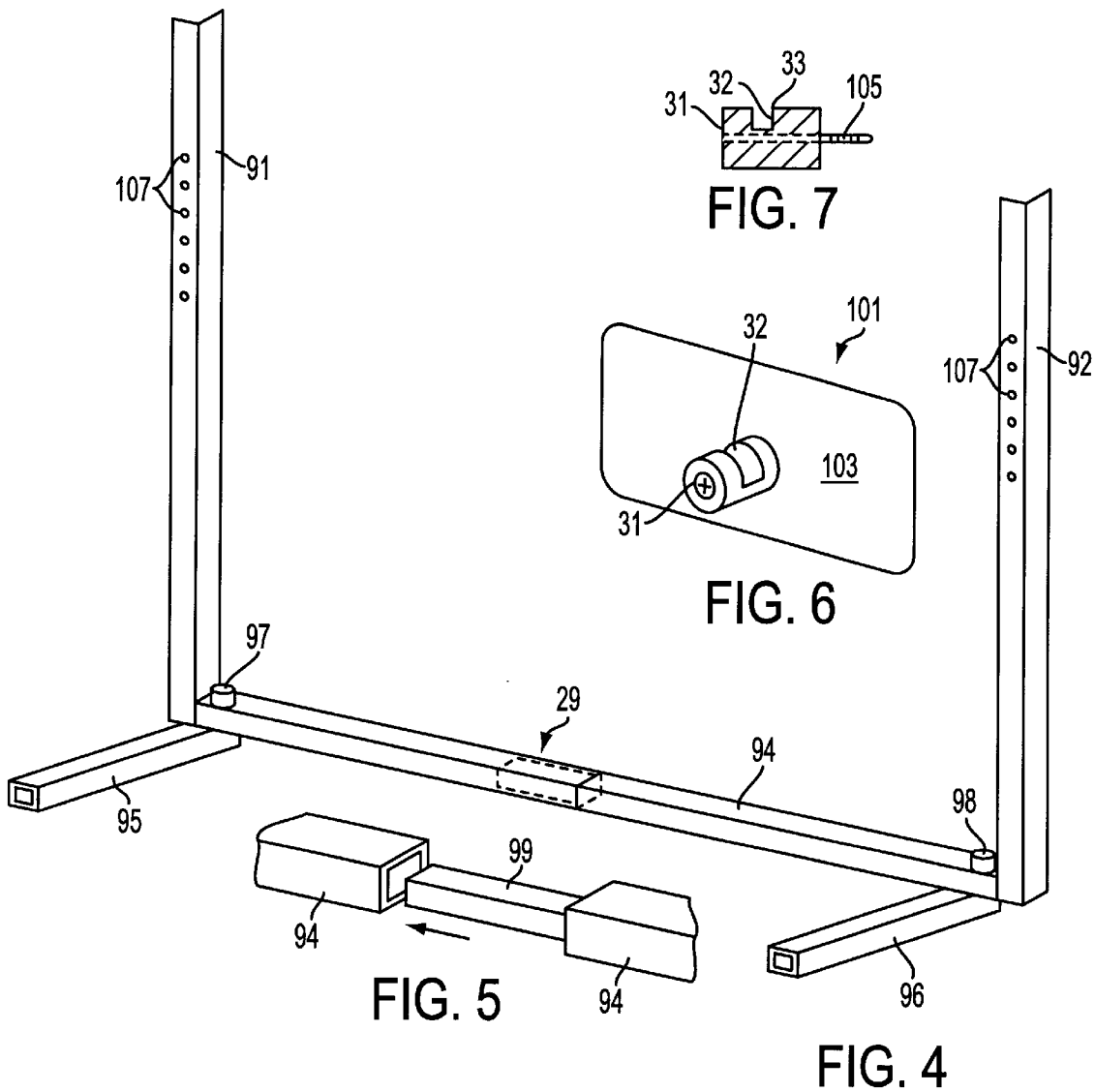

DISH DRAINING DEVICE

BACKGROUND OF THE INVENTION

1. Technical Field

This invention relates to a dish draining device that is arranged to support dishes, cutlery and other kitchen utensils in a position for gravity draining and air drying.

In particular, this invention relates to a dish draining device that may be fixedly attached to a wall, or may be mounted upon a stand that is placed on a counter top or other flat surface.

2. Background Art

The dish draining device of this invention is an improvement upon the device that is described and claimed in the inventor's previous U.S. Pat. No. 4,756,582. A variety of other devices for the same purpose are known in the art, including those disclosed in U.S. Pat. Nos. 3,258,127, 2,852,030, 2,635,027, 2,538,223 and 2,070,826. However, none of those prior art devices disclose the structural and design features that are provided by this invention.

SUMMARY OF THE INVENTION

The dish draining device of this invention includes a backsplash panel having a forwardly extending drip tray at the bottom thereof to catch water that drains from dishes and utensils held by the device to dry. The panel is secured to a stand, a wall, or other vertical surface by a pair of top-grooved dowels which attach to the surface and pass through openings provided in the panel. A wire frame having a generally rectangular perimeter element corresponding in size and shape to the panel includes downwardly opening, arcuate brackets that are sized to matingly fit within the dowel grooves so that the brackets both directly support the frame and also lock the frame and panel onto the support dowels. Racks to hold plates, bowls, glassware, cutlery and other utensils are mounted upon and supported by the frame. The device is easy and convenient to mount and assemble, takes up a minimum of kitchen counter space, and can easily be disassembled for cleaning.

Hence, it is an object of this invention to provide an improved dish draining device as compared to the inventor's prior device and those other units known in the art for the same purpose.

Other objects and advantages will become apparent from the following drawing figures and the description of preferred embodiments of the invention.

BRIEF DESCRIPTION OF THE DRAWING

FIG. 4 is a view of a free standing support member for the dish draining device;

FIG. 5 is a detail view of a portion of the support member of FIG. 4;

FIG. 6 is a view of a mounting pod for securing dish draining device of FIG. 1 to a wall or other vertical surface;

FIG. 7 is a cross-sectional view of a mounting boss;

DETAILED DESCRIPTION OF THE INVENTION

Figure 1:
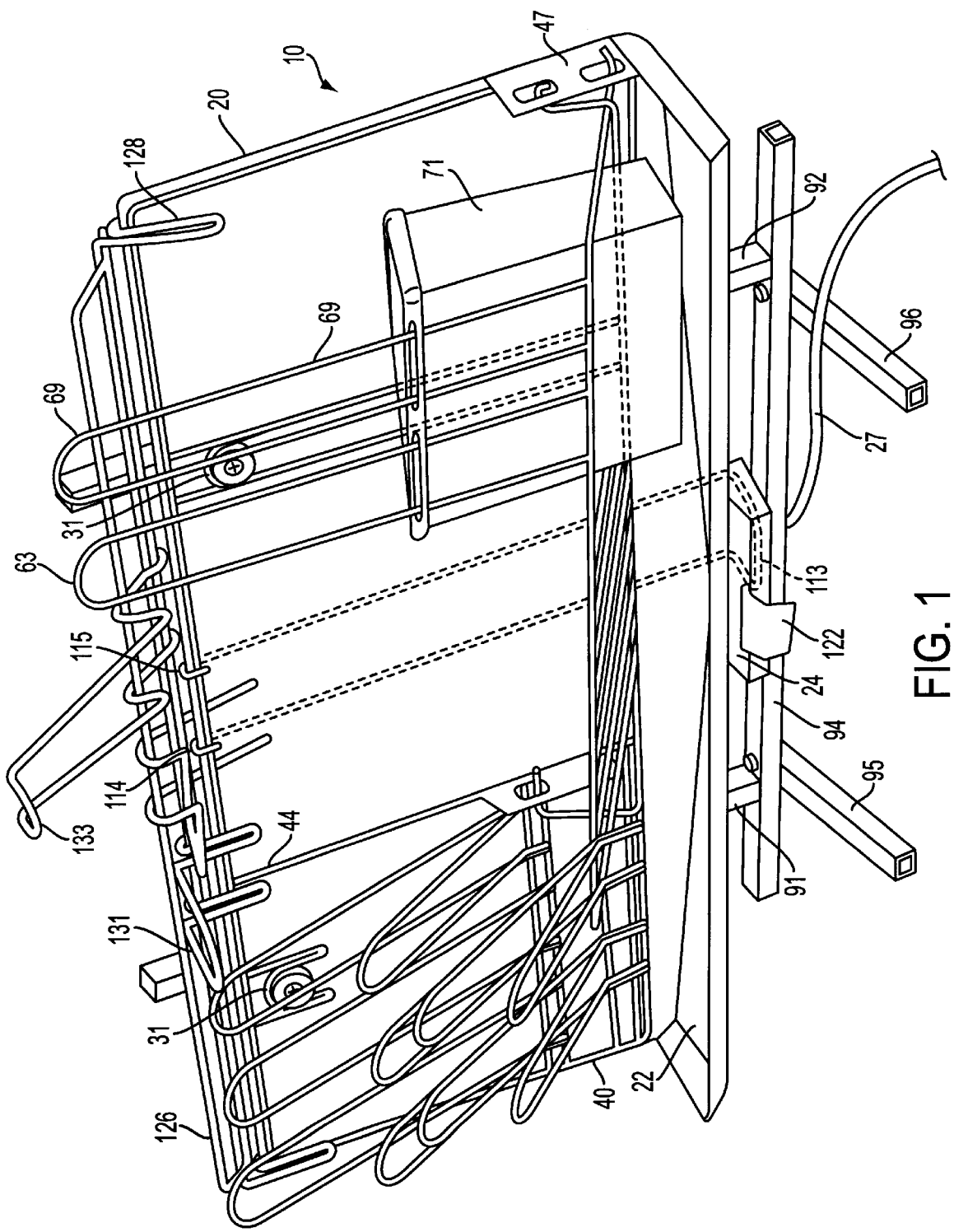
FIG. 1 is a perspective of the dish draining device of this invention mounted upon a stand that rests upon a flat surface.
Figure 2:
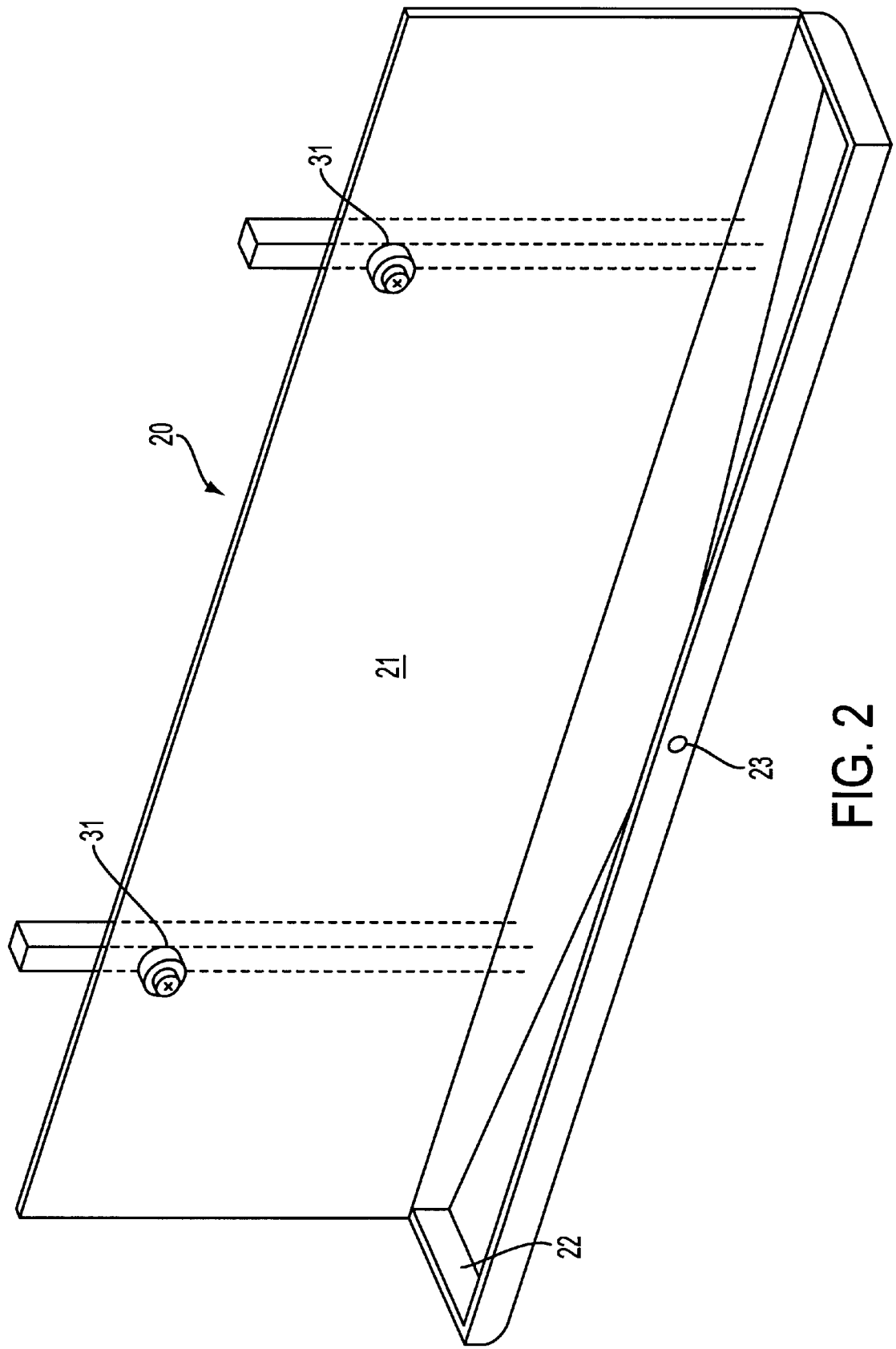
FIG. 2 is a perspective view of the backsplash panel and its associated catch basin.

Referring first to FIG. 1 of the drawing, the dish draining device of this invention is shown generally at 10. Device 10 includes a backsplash panel 20, which is shown in greater detail in FIG. 2, and a main frame member 40 which is shown separately in FIG. 3. Backsplash panel 20 includes a flat back plate 21 having a forwardly extending drip tray or catch basin 22 that is arranged to collect water draining from dishes and utensils held by device 10 to dry. The bottom of basin 22 is provided with a gradual slope toward a central drain 23 so that water collects in a removable water tray 24 which is held in place by tray support bracket 25. Support bracket 25 is depicted separately in FIG. 10. Alternatively, a small hose or conduit 27 leading to a sink or other disposal facility may be attached directly to the central drain.

Dish draining device 10 may be mounted directly upon a wall or other vertical surface, or it may be supported upon a movable stand 29. Stand 29 is shown in more detail in FIGS. 4 and 5. In either mounting mode, a pair of spaced apart openings are provided in back plate 21 to accept sliding entry of pin or dowel 31 which in turn is attached to a support. Dowel 31 is preferably cylindrical in shape, but may also be ovoid or polygonal in cross section. As is shown in more detail in FIGS. 6 and 7, dowel 31 is provided with an arcuate groove 32 that extends around the top and sides of the dowel at a location intermediate its ends. The length of dowel 31 is fixed such that the inner shoulder 33 of groove 32 is essentially flush with the forward surface of plate 21 thereby leaving groove 21 exposed when plate 21 is seated on the two dowels 31.

Figure 3:
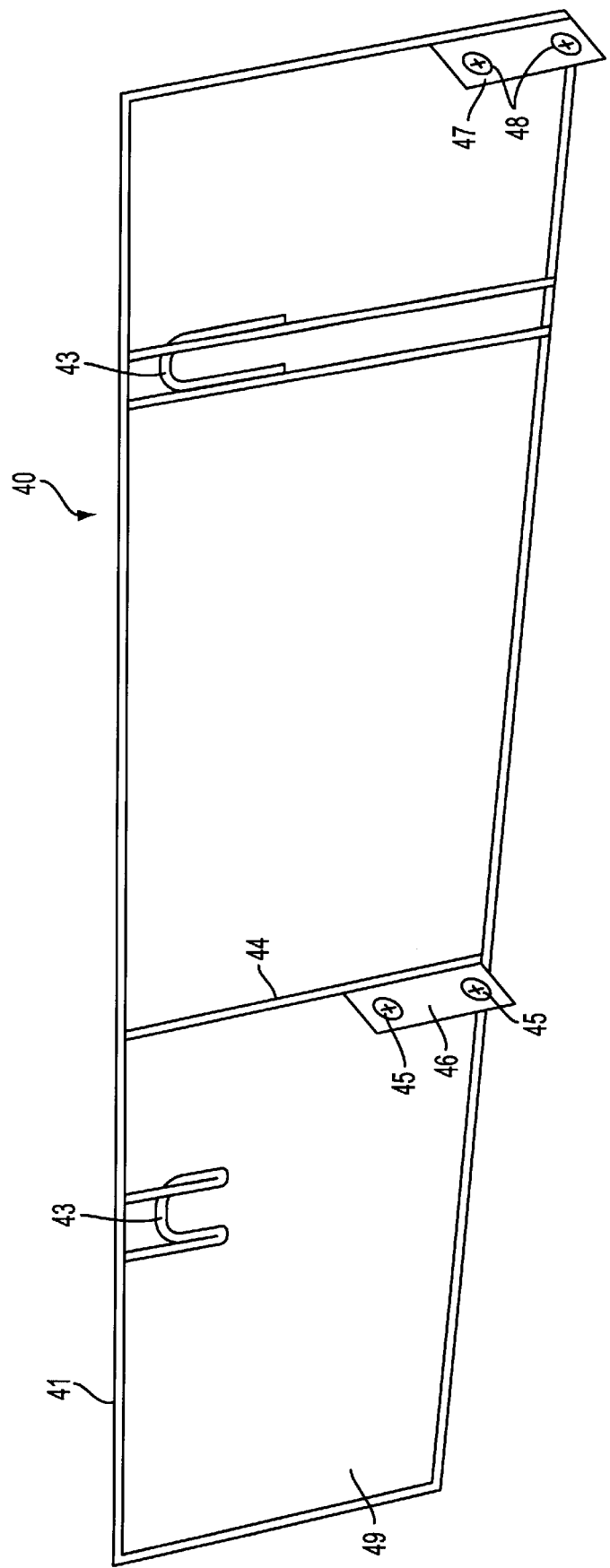
FIG. 3 depicts the main frame member of the device.

Referring now to FIG. 3 in combination with FIG. 1, main frame member 40 includes a generally rectangular perimeter element 41, suitably fabricated of heavy wire, that corresponds in size to back plate 21. A pair of downwardly opening arcuate brackets 43 attach to and extend downwardly from the top of perimeter element 41 at locations which align with the outwardly extending ends of dowels 31. Arcuate brackets 43 are sized to fit within groove 32 of dowels 31 so that brackets 43 provide direct support for frame member 40 and lock both frame member 40 and back plate 21 securely in place on dowels 31. At the same time, the unit may be easily and quickly disassembled simply by lifting frame 40 up and away from dowels 31.

Figure 9:
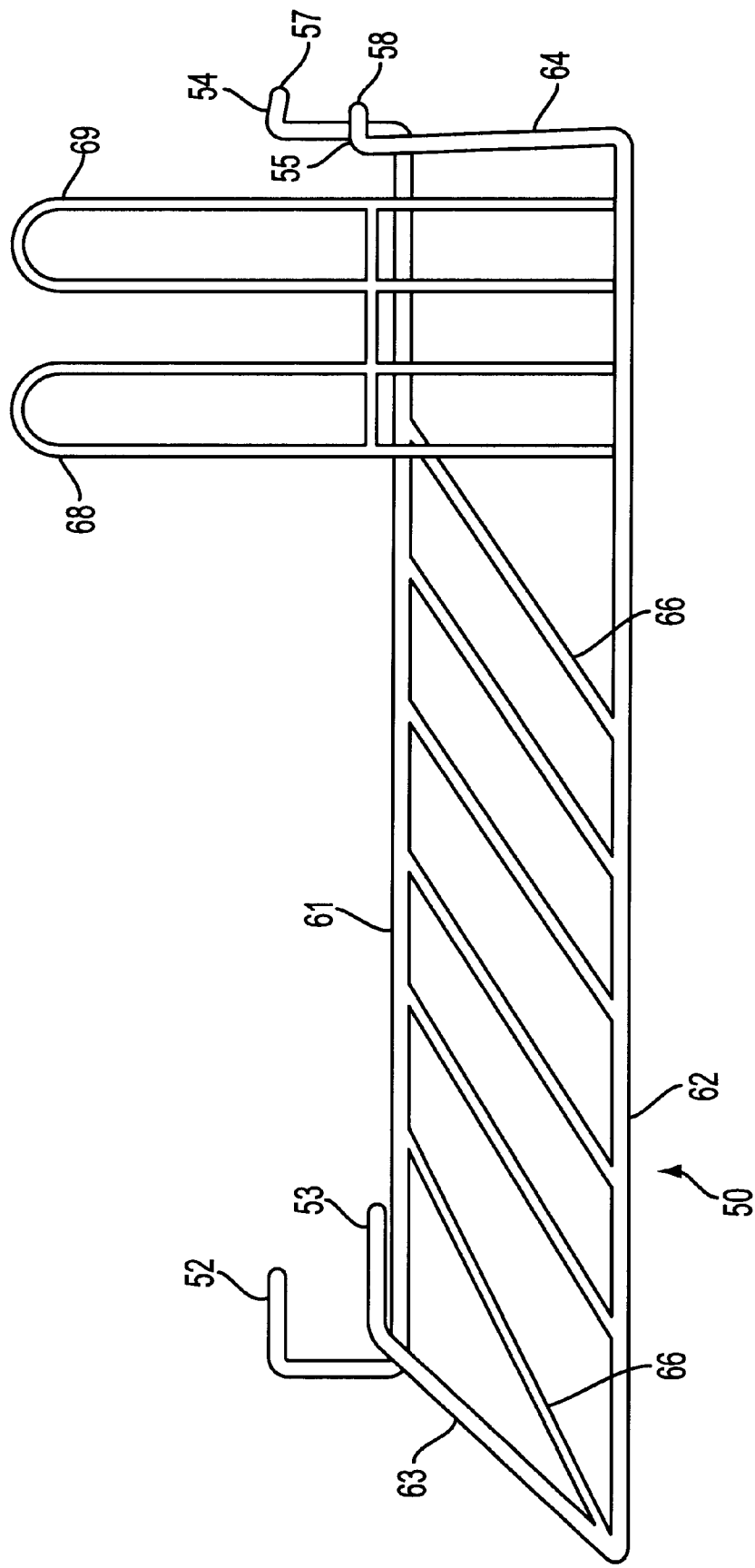
FIG. 9 is a perspective view of a plate holder rack that is detachably mounted to the main frame member.

Frame member 40 also includes a vertical member 44 that is placed intermediate the frame ends and is attached at its top and bottom to top and bottom of perimeter element 41. Member 44 both strengthens the frame and forms a support for a first anchor plate 46 located at the member bottom. Anchor plate 46 comprises a forwardly extending structural sheet having a pair of spaced apart openings 45 therein that are arranged to accept entry of heavy wire anchor guides 52 and 53 of plate rack holder 50 (FIG. 9.) A second anchor plate 47, similar to anchor plate 46, is attached to the side of perimeter element 41 adjacent the bottom thereof. As with anchor plate 46, plate 47 comprises a forwardly extending structural sheet also having a pair of spaced apart openings 48 that are arranged to accept entry of anchor guides 54 and 55 which are located at the opposite end of plate rack holder 50 from guides 52 and 53.

The anchor guides of plate rack holder 50 are arranged so that holder 50 may be easily attached to and removed from the anchor plates 46 and 47, while at the same time preventing inadvertent detachment of the holder from the anchor plates. Those functions are accomplished first by the length arrangement of the anchor guides. As shown best in FIG. 9, anchor guide 53 is the longest and is the first to be inserted within the corresponding opening in anchor plate 46. As soon as the end of guide 53 is inserted within the opening in plate 46, it forms a guide for placement of intermediate length guide 52 in the other plate opening. Anchor guides 54 and 55 are shortest, and cannot be fit within their respective openings in anchor plate 47 until intermediate length guide 52 is in place. Additionally, the ends 57,58 of one or both of anchor guides 54 and 55 are bent downwardly to form a hook that resists disengagement from the anchor plate 47 to thereby detachably secure plate rack holder 50 to the anchor plates of the main frame member.

Overall, plate rack holder 50 includes a generally rectangular frame having a rear frame member 61, a front frame member 62, and a pair of frame side members 63 and 64. Anchor guides 52 and 53 may conveniently be fabricated from heavy wire, and are rigidly attached to one end of rear frame member 61. Guides 54 and 55 are of similar construction and are similarly attached to the other end of member 61. The attitude of the anchor guides relative to the rack holder frame is set such that front frame member 62 is at a higher elevation than is rear frame member 61 when holder 50 is attached to the anchor plates. A plurality of equi-spaced rods 66 extend diagonally between front frame member 62 and rear frame member 61 to provide slots to hold plates while they are draining and drying.

Figure 15:
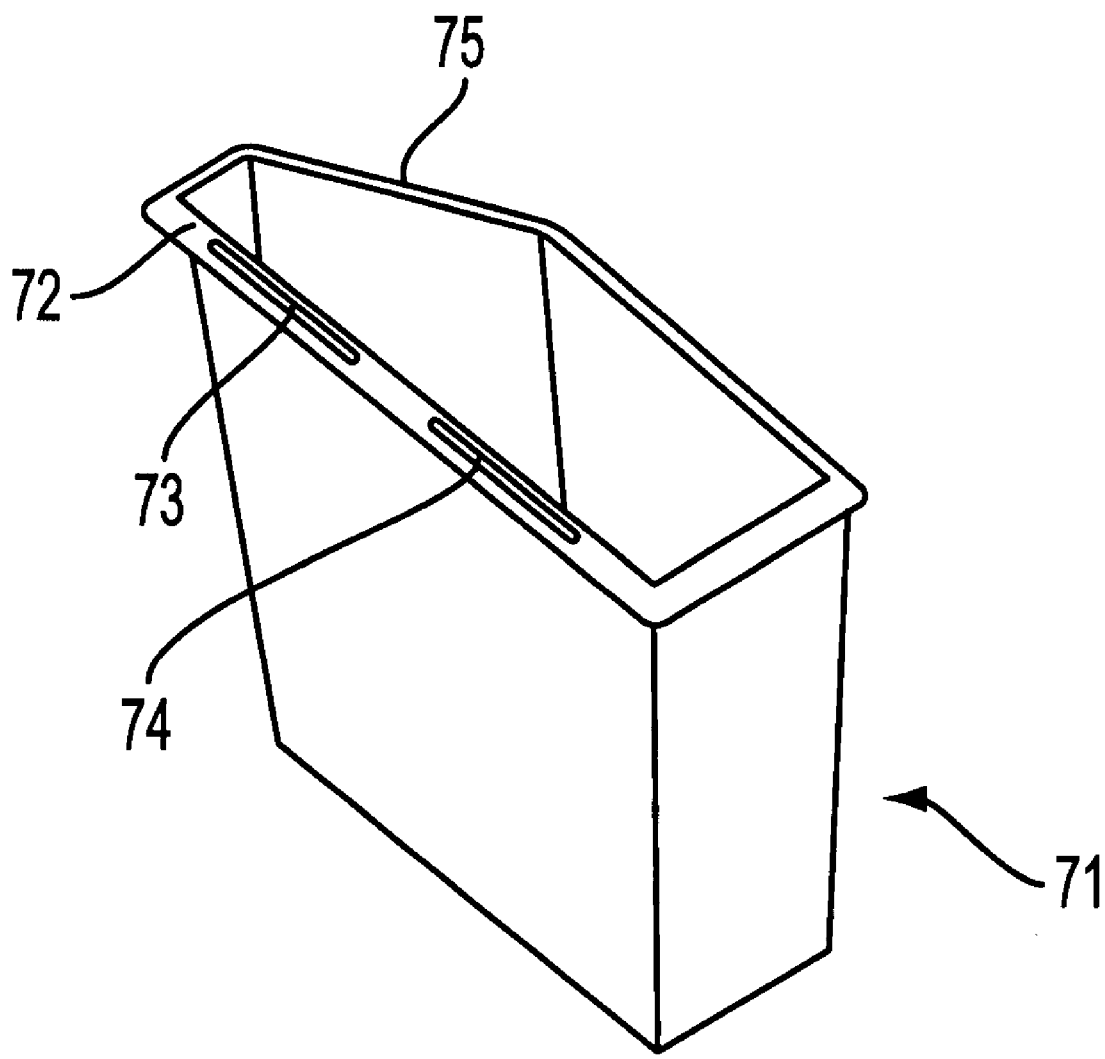
FIG. 15 is a perspective view of a cutlery basket that is held above the catch basin by the plate rack holder that is shown in FIG. 9.

Also attached to front frame member 62 adjacent the end thereof are at least one, and suitably two, vertically upstanding inverted U-shaped members 68 and 69. Members 68 and 69 perform a dual function. A cutlery basket 71 (FIG. 15) is provided with an outwardly extending lip 72 having a pair of slots 73 and 74 extending through the lip. Those slots are sized and spaced to accommodate passage of U-shaped members 68 and 69 to thereby hold basket 71 in place. The upper ends of members 68 and 69 then may be used to support inverted cups or glasses for draining and drying. Basket 71 is preferably of trapezoidal shape as is shown with one side 75 formed at an acute angle to lip 72 and conforming to the angle that rods 66 make with the front and rear frame members so that side 75 is generally parallel to rods 66.

Figure 8:
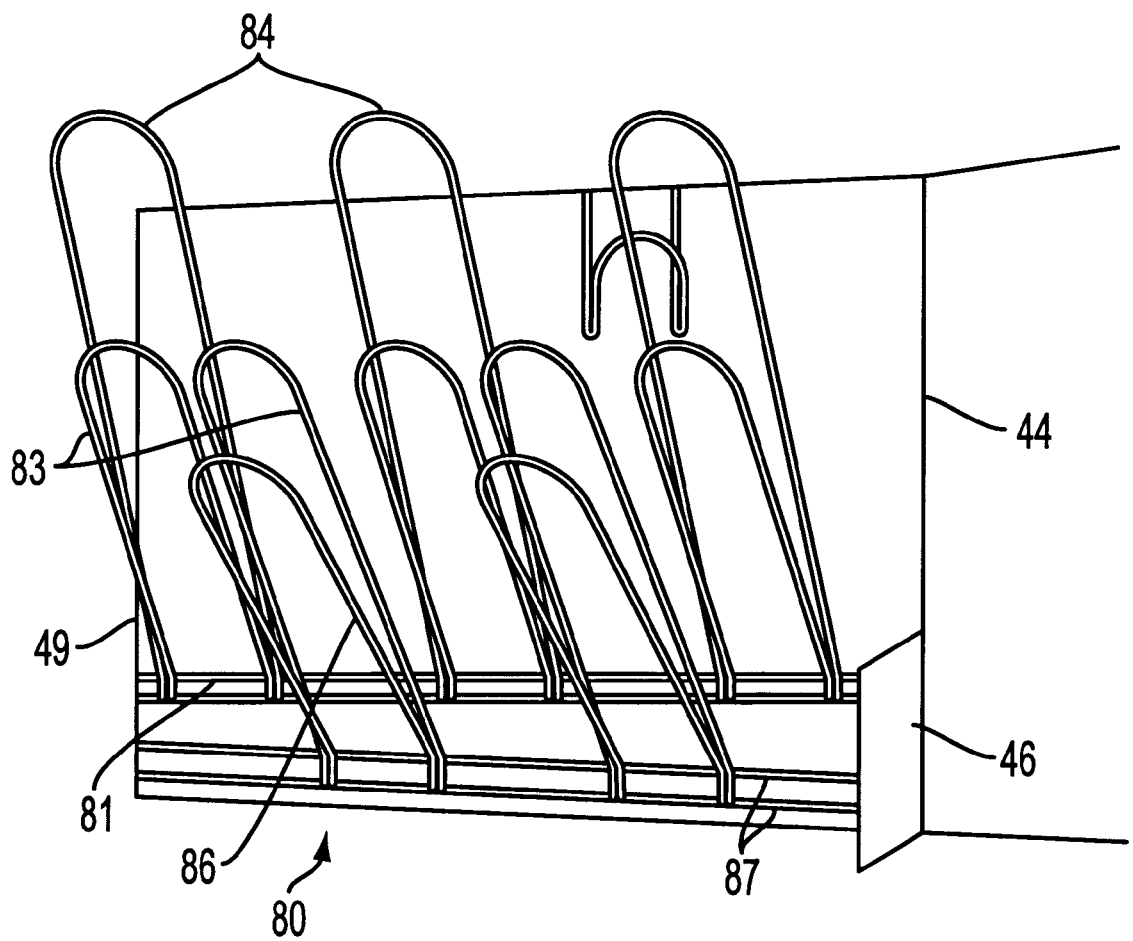
FIG. 8 depicts a holding rack for glass ware that is fixed to the main frame member at one side thereof.

Referring now to FIG. 8, there is shown a holding rack 80 for supporting cups and glassware for drainage and drying. Rack 80 includes an upper support member that may comprise a pair of closely spaced parallel rods 81 that extend from side 49 of perimeter element 41 to the vertical member 44. Rods 81 support horizontal rows of long and short variously inclined inverted U-shaped members 83 and 84 which are sized to hold inverted glassware for drainage and drying. An additional row of inclined U-shaped members 86 is supported upon another pair of closely spaced parallel rods 87 which also extend from side 49 of perimeter element 41 to the vertical member 44.

As was mentioned previously, dish draining device 10 may be mounted upon a wall or other vertical surface, or it may be mounted upon a stand 29. Stand 29 is shown in greater detail in FIG. 4. It includes two upstanding arms 91 and 92 joined at a set spaced apart distance by cross member 94. A pair of horizontal support members 95 and 96 are pivotally attached to cross member 94, one adjacent its connection to each of the upstanding arms, by way of pin means 97 and 98. In a preferred embodiment, cross member 94 is constructed of rectangular tubing pieces and is arranged to separate into two parts at a location at or near the midpoint thereof as is illustrated in FIG. 5. A bar-like, like, friction lock member 99 that is sized to fit within tubular cross member 94 serves to removably join the sections of cross member 94 together when the frame is assembled, yet allows the stand to be taken apart and compactly folded for transport or storage.

FIG. 6 illustrates a mounting pod 101 that may be used when dish draining device 10 is wall mounted. Pod 101 includes a base plate 103 that may be fixedly attached to a wall surface by means of a suitable adhesive, or may be detachably secured to a wall surface using a Velcro pad connector for that purpose. A pin or dowel 31 is centrally mounted on the base plate 103 and, as was previously described, dowel 31 is formed with an arcuate groove 32 that extends around the top and sides of the dowel at a location intermediate its ends to accept mating fit with arcuate brackets 43 of main frame 40.

For wall mounting of the dish draining device 10, a pair of pods 101 are secured to a wall surface at a spaced apart distance such that the dowels 31 fit through the openings provided in back plate 21. Additionally, each dowel 31 may be drilled along its cylindrical axis for passage of a suitable fastener such as screw 105. The screw 105 is then seated in a wall stud or other structural member to secure the dowel and dish drainer at the desired location. Because wall studs are usually placed on 16-inch centers, it is preferred that the spacing between dowel openings in the base plate 21 and the spacing between upstanding arms 91 and 92 of stand 29 also be set at 16 inches.

Pod 101 may also be used when the dish draining device 10 is mounted upon stand 29. In that mounting embodiment, stand arms 91 and 92 are provided with an array of vertically spaced holes 107 to accommodate the direct mounting thereon of dowel 31 by means of screw fastener 105. Base plate 21 is then hung upon the dowels and locked in place by the main frame bracket 43.

Figure 10:
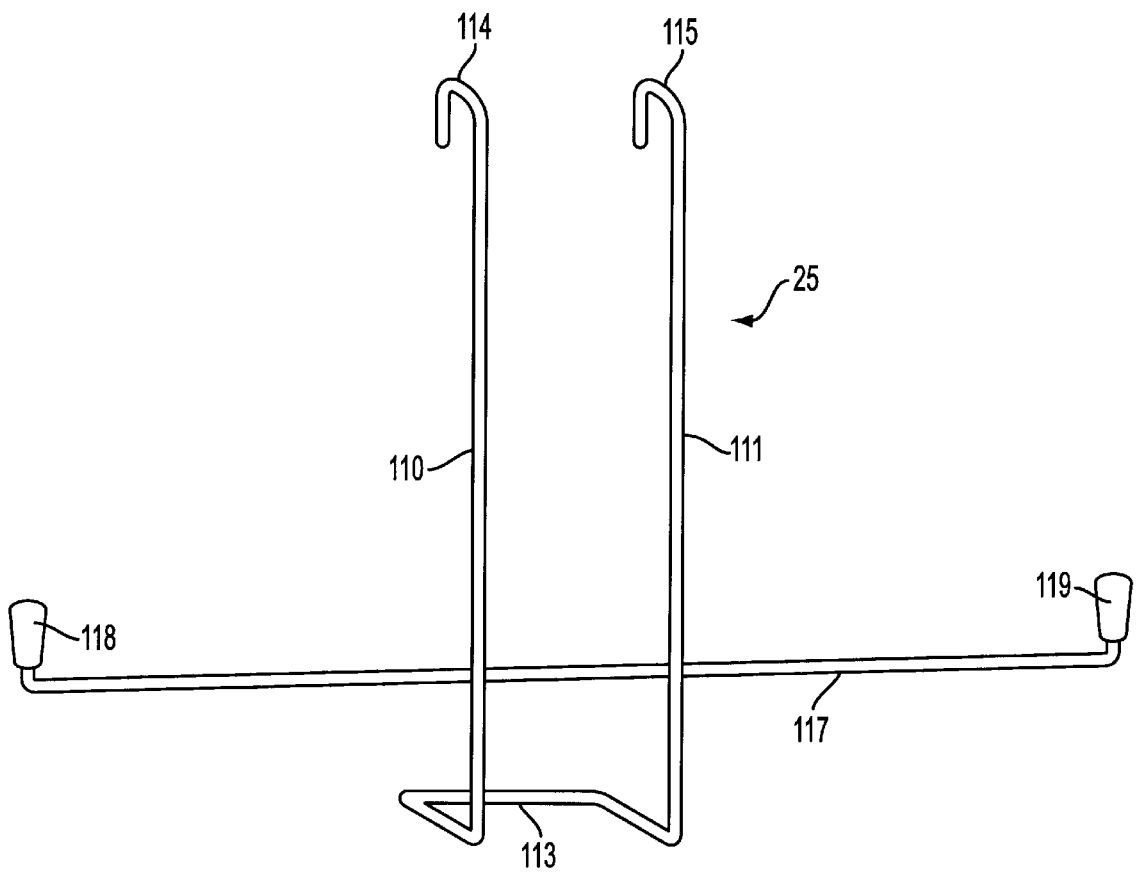
FIG. 10 depicts a support for a removable water tray which provides a reservoir for the catch basin that is depicted in FIG. 2.
Figure 11:
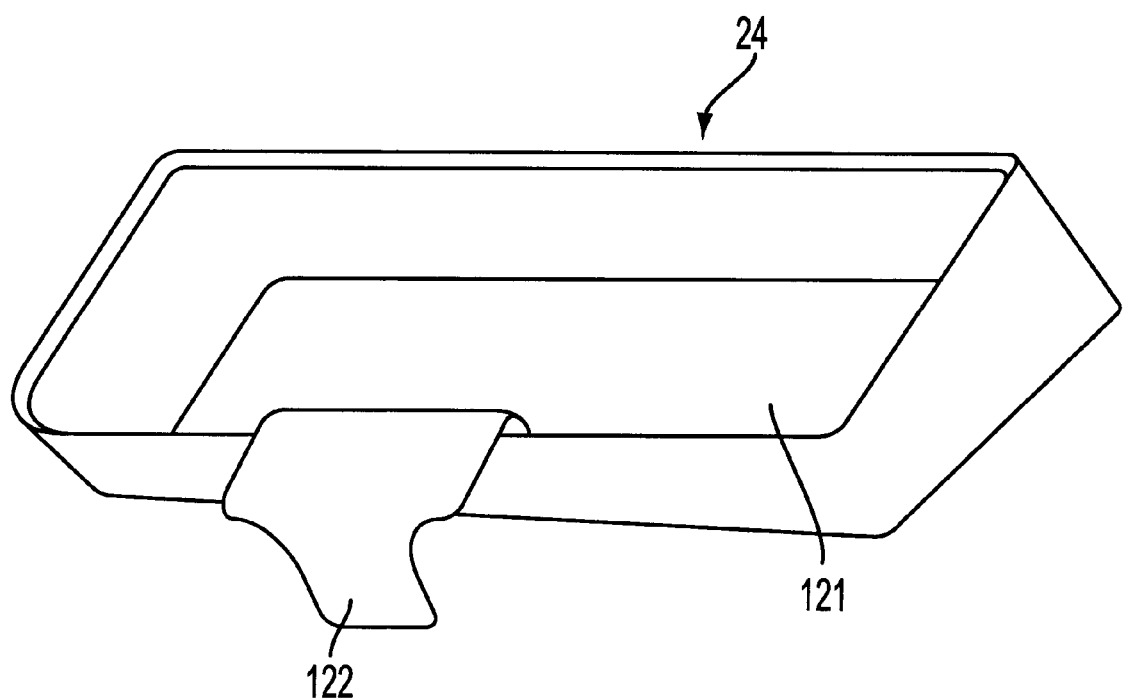
FIG. 11 is a perspective view of the removable water tray.

FIGS. 10 and 11 depict a support bracket 25 for removable water tray 24 which acts as a reservoir for water collected in catch basin 22. Bracket 25 includes a pair of vertical rod members 110 and 111 disposed parallel one to the other and joined at their bottom ends by loop 113 that forms a support for tray 24. The top end of each of rod members 110 and 111 is bent forward and downwardly to form hooks 114 and 115 that are sized to fit securely over the top of back plate 21 and the top of perimeter element 41 of main frame 40 as is illustrated in FIG. 1. A cross member 117 is fixed perpendicularly to vertical rods 110 and 111 at a location intermediate loop 113 and hook ends 114, 115. The ends of member 117 are preferably bent backwardly in opposite direction to loop 113 and hook ends 114, 115 and are each capped with a resilient spacer, 118 and 119. Those spacers, which may be made of rubber, serve to hold the lower margin of back plate 21 forward of the wall when device 10 is wall mounted. Tray 24, shown in FIG. 11, comprise a shallow, open receptacle with a flat bottom 121 that is adapted to rest upon and be supported by loop 113. A handle 122 may be provided at the front of the tray to facilitate placement and removal of the tray upon loop 113.

Figure 12:
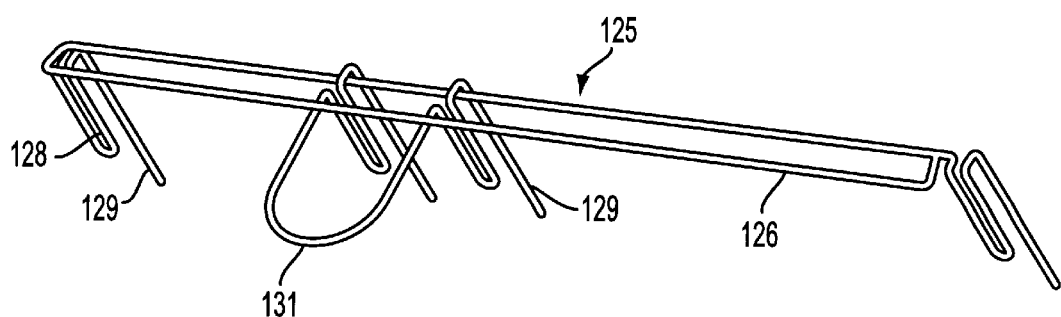
FIG. 12 is a perspective view of a removable rack that fits atop the backsplash panel.

A removable bowl and utensil rack 125 that fits along the top of back plate 21 and frame 40 is shown in FIG. 12. Rack 125 includes an elongated rectangular frame 126 which defines a slot-like opening for supporting bowls and other utensils. Rack 125 is held in place along the top of dish draining device 10 by a plurality of mounting clips attached to frame 126. Each clip may be formed as a downwardly extending loop 128 having a leg segment 129 that parallels loop 128. Leg segment 129 is adapted to fit to the rear of back plate 21 while loop 128 is disposed to the front thereof so as to hold the rack 125 securely in place. Two clips may be joined together by means of a horizontally extending U-shaped bend 131 that serves as a support for larger bowls or utensils.

Figure 13:
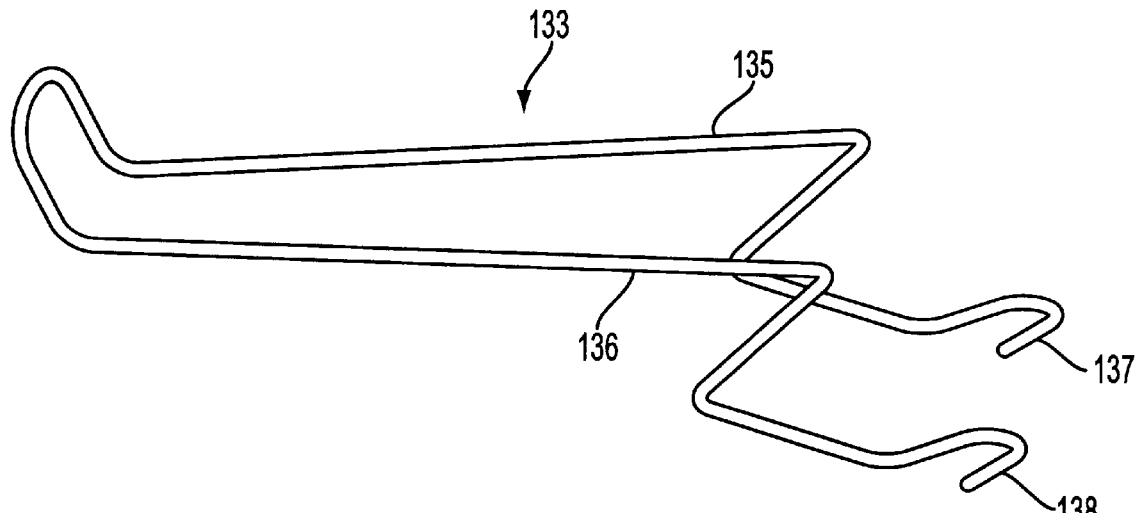
FIG. 13 is a perspective view of a bowl clip that mounts onto the top of the backsplash panel.
Figure 14:
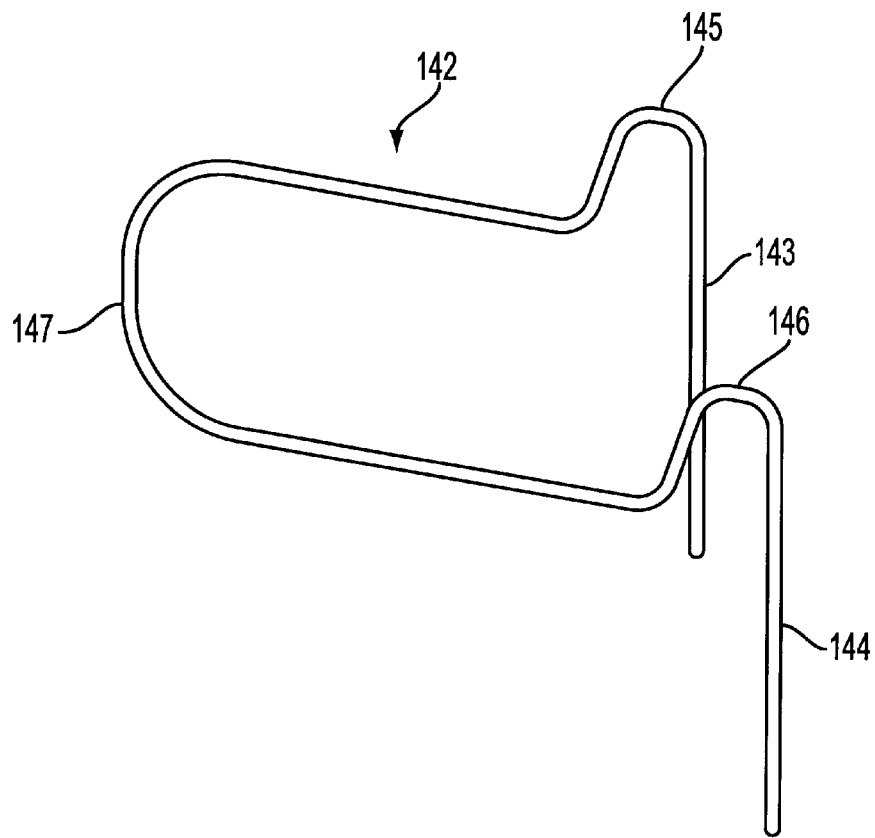
FIG. 14 is a perspective view of a utensil holder.

A removable bowl clip 133 is shown in FIG. 13. Clip 133 may be formed from a single piece of stiff wire having symmetrical and generally parallel leg segments 135 and 136 which terminate in hook elements 137 and 138 which are adapted to attach to frame 126 of rack 125 in the manner shown in FIG. 1. FIG. 14 illustrates another utensil holder 142 that also may be fabricated from a single piece of stiff wire. Holder 142 includes a pair of downwardly extending legs that are recurved to form bends 145 and 146 which are sized such to fit over the top of back plate 21. Bends 145 and 146 are connected by way of outwardly extending, generally horizontal loop member 147 which forms a nesting support for bowl or other utensil.

Dish draining device 10, whether mounted upon a wall or upon stand 29, takes up only a small amount of counter space and so is particularly useful in small kitchen areas such as those often found in trailers, recreational vehicles and the like. It is likewise easy to take apart for cleaning and to thereafter reassemble for use.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

I claim:

1. A dish draining device comprising:

a panel having a generally rectangular shape, said panel having a forwardly extending catch basin disposed at the bottom thereof, said panel having at least two spaced apart openings, said openings being of regular shape and adapted to accept sliding passage of a support member therethrough;

mounting means for said panel, said mounting means including a plurality of pin-like support members, one for each of said openings, each said member being of size and shape to slidingly pass through said openings and having means at one end for attachment to a vertical surface;

a groove extending across the top of each said member at a location adjacent the free member end opposite its attachment, said groove having an outer shoulder adjacent the free member end and an inner shoulder, the length of said member fixed such that said inner shoulder is essentially flush with an outer surface of said panel to thereby leave said groove exposed when the panel is seated on said support members;

a frame comprising a generally rectangular perimeter element that corresponds in size and shape to said panel, said frame including a plurality of arcuate brackets, one for each said support member, said brackets extending downwardly from the top of said perimeter element and arranged to matingly fit within the groove formed across the top of each said member to thereby support said perimeter element and to lock said frame and panel securely in place on said support members; and a plurality of upwardly inclined, U-shaped members attached to said frame and sized to hold inverted glassware for draining and air drying.

2. The dish draining device of claim 1 wherein said pin-like support members are cylindrical dowels, and wherein said grooves extend around the top and sides of the dowels.

3. The dish draining device of claim 1 wherein said frame perimeter element is formed from heavy wire and wherein a vertical member extends from the top to the bottom of said perimeter element at a location intermediate the frame ends, said vertical member having a first anchor plate fixed thereto adjacent the bottom of said vertical member, said anchor plate comprising a forwardly extending structural sheet having a pair of spaced apart openings therein.

4. The dish draining device of claim 3 including a second anchor plate, said second anchor plate comprising a forwardly extending structural sheet having a pair of spaced apart openings therein and attached to a side of said perimeter element adjacent the bottom thereof, said device further including a utensil-holding rack having a pair of guide means at each rack end, said guide means arranged to fit into the spaced apart openings in said first and second anchor plates to thereby removably secure said rack to said frame.

5. The dish draining device of claim 4 wherein said utensil-holding rack comprises a generally rectangular wire frame having a rear frame member, a front frame member and a pair of side members, wherein one pair of said guide means is attached to one end of said rear frame member, wherein each of the guide means of said pair is formed as a straight length of heavy wire, and wherein one of said guide means is longer than the other of said guide means.

6. The dish draining device of claim 5 wherein a second pair of guide means is attached to the other end of said rear frame member, wherein at least one of the guide means of said second pair is bent downwardly to form a hook, and wherein both guide means of said second pair are shorter than either of the guide means of said first pair, the sequentially increasing lengths of said guide means facilitating the stepwise attachment of said rack to the frame.

7. The dish draining device of claim 5 including a plurality of equi-spaced rods extending diagonally from the front frame member of said rack to the rear frame member, said rods spaced and arranged to hold plates for draining and drying, and wherein said guide means are positioned such that the front rack frame member is at a higher elevation than is the rear rack frame member when said rack is attached to said frame.

8. The dish draining device of claim 7 including at least one vertically upstanding inverted U-shaped member attached to the front frame member of said rack, said device including a cutlery basket having an outwardly extending lip at the top thereof, said lip having a slot that is sized and shaped to accommodate passage of said inverted U-shaped member to thereby hold said basket in place on said rack.

9. The dish draining device of claim 1 including a removable bowl and utensil rack arranged to fit across the top of said panel and perimeter frame that defines a slot-like opening for supporting bowls and other utensils, said rack comprising an elongated rectangular wire frame, said frame having a plurality of mounting clips attached thereto, each said mounting clip comprising a downwardly extending loop and a parallel leg segment, said loop fitting to the front of said panel and frame and said leg segment fitting to the rear thereof, to thereby hold said rack securely in place atop said panel and frame.

10. The dish draining device of claim 1 wherein said catch basin has a central drain, and wherein said device includes a removable water tray disposed beneath said drain, said tray acting as a reservoir for water draining from dishes placed on said device and collecting in said catch basin.

11. The dish draining device of claim 2 wherein said dowel is fixed to a base plate, and the side of said plate opposite said dowel is arranged for attachment to a vertical surface.

12. The dish draining device of claim 11 wherein said vertical surface is a wall, and wherein said plate is attached to said wall by means of an adhesive Velcro pad connector.

13. The dish draining device of claim 11 wherein said vertical surface is an upstanding arm of a support stand, and wherein said plate is connected to said stand by means of a screw fastener that extends through said dowel along the cylindrical axis thereof and into said arm.

14. The dish draining device of claim 13 wherein said stand includes two upstanding arms that are joined at a set, spaced-apart distance by means of a cross member.

15. The dish draining device of claim 14 wherein said spaced-apart distance is sixteen inches.

16. The dish draining device of claim 1 wherein two openings are provided in said panel, and said openings are spaced sixteen inches apart.

* * * * *